United States Statutory Invention Registration [19]

[11] Reg. Number: H276

Siems [43] Published: May 5, 1987

[54] OPTICAL TIME BREAK DETECTOR

[76] Inventor: Lee E. Siems, 4003 Aspen Wood, Fort Bend County, Richmond, Tex. 77469

[21] Appl. No.: 878,710

[22] Filed: Jun. 25, 1986

[51] Int. Cl.[4] ..... G04B 47/00; G01D 9/00

[52] U.S. Cl. ..... 368/10; 102/293; 346/146; 346/33 C

*Primary Examiner*—Stephen C. Buczinski
*Assistant Examiner*—Linda J. Wallace

[57] ABSTRACT

A method and apparatus for detecting the instant on explosive is detonated by way of an optical signal. A length of optical fiber has one end wrapped around or positioned near the explosive with the other end coupled to a remote recorder. The end of the fiber at the explosive has been cleaved so as to internally reflect an optical signal propagating therein. A beam of radiation is launched into the fiber at the record where it is reflected from the distal end and redirected back to the recorder where it is detected. Detonation of the explosive destroys the reflective end of the optical fiber causing the radiation to leak from the broken fiber end. The instant the recorder does not receive the reflected radiation is the instant of the explosive detonated.

6 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

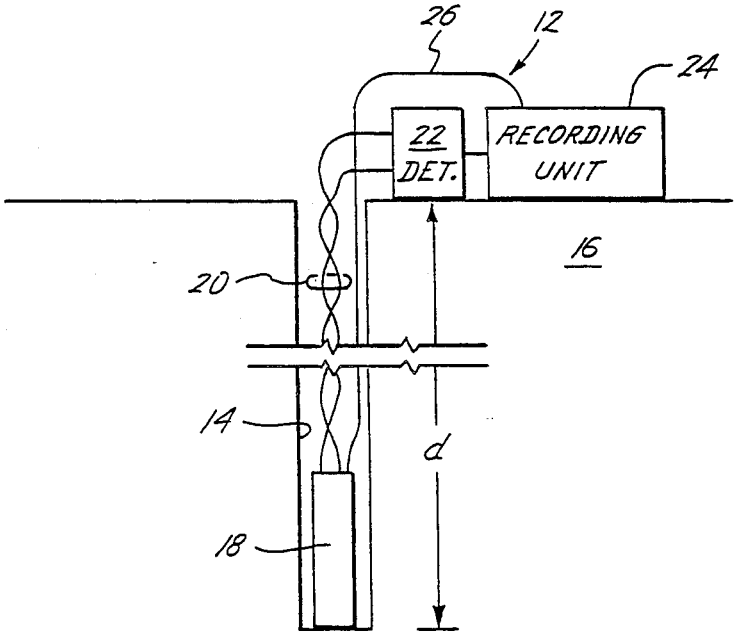

OPTICAL TIME BREAK DETECTOR

BACKGROUND OF THE INVENTION

1. Field of the Invention

This invention relates to seismic exploration and particularly to a method and apparatus for determining the instant an explosive is detonated.

2. Description of the Related Art

In seismic exploration using explosives as the seismic source, it is desirable to know precisely, the instant of detonation. Currently, the time of detonation, commonly referred to as the "time break" is determined by measuring the time the electrical continuity between the two wire leads of a blasting cap is broken. Closing the switch in the detonator circuit causes a signal to be sent to the controller resulting from the brief flow of current through the circuit before the lead wires in the blasting cap are broken. Plasma generated by the explosion of the blasting cap conducts current in the circuit after detonation, thus the signal sent by the detonator to the time recorder is actually longer than that actually representing the instant of detonation. The accuracy of that method is in the order of 0.1 millisecond (ms). With the advent of more modern and accurate geophysical equipment, it is desired to determine the instant of detonation with an accuracy of one microsecond or better.

SUMMARY OF THE INVENTION

It is an object of this invention to determine the exact instant a blasting cap is detonated.

In accordance with an object of this invention, a length of disposable optical fiber may be wrapped around or placed in close proximity to the blasting cap. One end of the optical fiber is cleaved and polished so as to cause complete internal reflection of a beam propagating therein. The opposite end of the fiber has a three decibel coupler with one of the two ports of the coupler connected to a light source such as a laser and the other port connected to a light detector. The light detector is operably coupled to a controller which is interfaced with the detonator circuit of the blasting cap. The light source directs a coherent beam of radiation into the optical fiber, which propagates to the end and is totally reflected back in the opposite direction where it is detected by the light detector. When the detonator circuit is closed and the blasting cap is detonated, the force of the explosion will break the optical fiber, interrupting the reflected optical signal. The instant the light detector does not receive the reflected radiation is substantially the instant of detonation which is recorded.

BRIEF DESCRIPTION OF THE DRAWINGS

A better understanding of the benefits and advantages of my invention may be obtained from the appended detailed description and the drawings, wherein.

DETAILED DESCRIPTION OF THE PREFERRED EMBODIMENT

Figure 1:
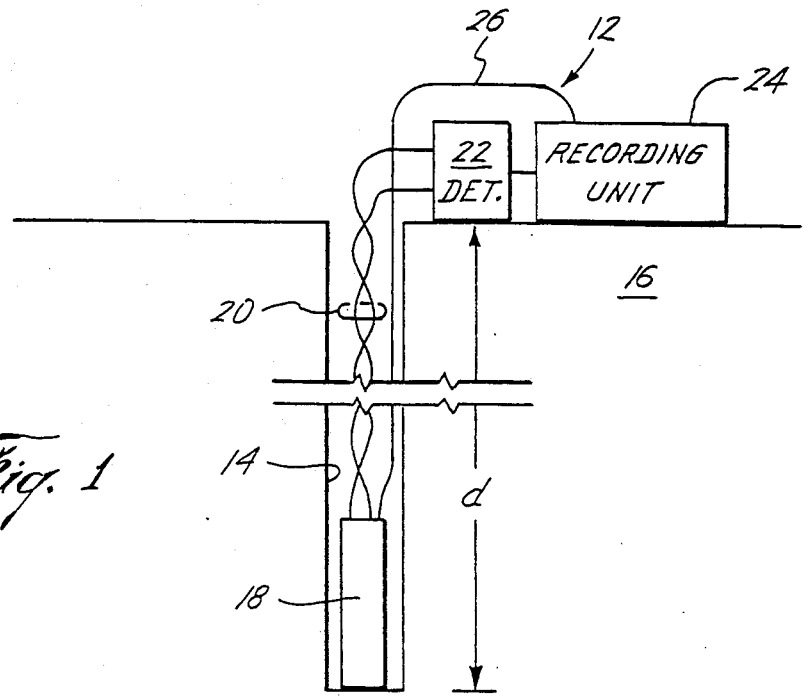
FIG. 1 is a general diagram of an explosive charge in a shot hole.

FIG. 1 is a generalized diagram of a seismic shot point 10 employing an optical time-break detector 12 of the instant invention. The shot point 10 includes a shot hole 14 having a predetermined depth d, such as two hundred feet below the surface of the earth 16, having a quantity of explosive 18, such as dynamite, disposed at the bottom thereof. The explosive 18 has at least one blasting cap (not shown in FIG. 1) embedded therein, coupled by wire leads 20 to a detonator 22 on the surface 16. The optical time-break detector 12 includes a time-break recording unit 24, interfaced with the detonator 22, from which a length of optical fiber 26 extends into shot hole 14. The free end of optical fiber 26 may be wrapped around the blasting cap or be within at least six inches thereof.

Figure 2:
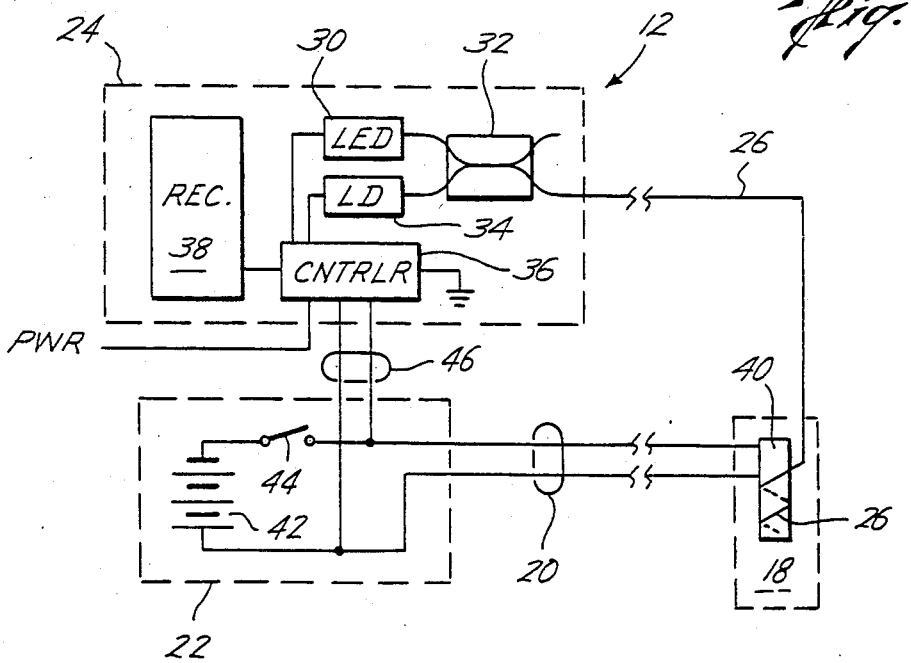
FIG. 2 is a generalized schematic diagram of the apparatus of this invention.

FIG. 2 is a generalized schematic diagram of the optical time-break detector 12. A light source 30 such as a light emitting diode (LED) within the recording unit 24 is in optical communication with optical fiber 26 by way of a 3 decibel (dB) optical coupler 32 and optical-fiber segment 33 coupled near a first end of the fiber 26. The first end of optical fiber 26 is in optical communication with a light detector (LD) 34 which is operably coupled to a controller 36 which in turn is operably coupled to a recorder 38. Controller 36 may include a microprocessor for internal timing. The controller 36 is powered externally by line PWR which also supplies power to the diodes 30 and 34 and the recorder 38. The opposite or second end of optical fiber 26 may be wrapped around, or located proximate to the blasting cap 40 which is embedded within the explosive 18 or the fiber may be wrapped around the explosive charge itself. The second end of optical fiber 26 may be cleaved and polished substantially perpendicular to the longitudinal axis of the fiber 26. This creates an internal optically-reflective end surface. The blasting cap 40 is in turn coupled by wire leads 20 to a battery 42 through blaster switch 44 in the detonator 22. The detonator 22 is interfaced with the controller 36 by conductors 46.

In operation, when light source 30 is turned on, it generates a coherent beam of radiation having a predetermined band width which is launched into optical fiber 26 via optical-fiber segment 33 and the 3 dB optical coupler 32. The radiation propagates down optical fiber 26 and is reflected in the opposite direction by the cleaved second end of the fiber at the blasting cap 40. The counter propagating radiation returns to the first end of the fiber 26 where it is directed into the light detector 34 creating a logical one state of a control voltage in the controller 36 which may be recorded on recorder 38.

When blaster switch 44 is closed, cap 40 explodes, rupturing the end of fiber 26, interrupting the reflected light beam. Absence of the light beam causes the recorded control voltage to drop to a logical zero. The instant of change is the time break or cap fire-time.

In another embodiment of this invention, a length of optical fiber may have a first end coupled to the light source such as the LED 30, and a second end coupled to the light detector 34 forming an optical loop. Midway along the optical loop, between the LED 30 and light detector 34, the optical fiber may be wrapped around or proximate to the blasting cap 40 similar to that described above. Detonation of the explosive interrupts the optical path of the radiation beam, resulting in determination of the time of detonation.

For illustrative purposes, my invention has been described with a certain degree of specificity. Variations will occur to those skilled in the art but which may be included within the scope and spirit of this invention which is limited only by the appended claims.

I claim:

1. A method for detecting the instant an explosive is detonated, comprising the steps of:

(a) directing a coherent beam of radiation through an optical waveguide having a portion proximate said explosive;

(b) receiving said coherent beam of radiation from said optical waveguide at a recording unit;

(c) causing said explosive to detonate so as to break said portion of said optical waveguide proximate thereto; and (d) recording the instant said coherent beam of radiation is not received by said recording unitl 2. An apparatus for detecting the instant an explosive is detonated, comprising:

(a) an optical waveguide having a first and a second end and a predetermined portion of the optical waveguide proximate said explosive;

(b) means for launching a coherent beam of radiation into said optical waveguide;

(c) means for receiving said coherent beam of radiation from said optical waveguide; and (d) means for recording the instant said coherent beam of radiation is not received by said means for receiving when said explosive is detonated.

3. An apparatus for substantially determining an instant in time an explosive is detonated, comprising:

(a) waveguide means having a first and a second end, said first end having an internal optically reflective surface, said first end being disposed proximate said explosive;

(b) means coupled to said second end, distant from said explosive for directing a beam of radiation into said waveguide means so as to direct said beam against said internal optically reflective surface at said first end;

(c) means coupled to said second end of said waveguide means for receiving said beam of radiation reflected from said first end;

(d) means for detonating said explosive so as to rupture said waveguide means proximate thereto, so that rupture of said waveguide means interrupts said reflected beam of radiation; and (e) means for recording the instant of interruption of said reflected beam of radiation.

4. An apparatus as recited in claim 2, further comprising means at said first end of said optical waveguide for internally reflecting said coherent beam of radiation incident thereon.

5. An apparatus as recited in claim 2, wherein said first end of said optical waveguide is cleaved and polished substantially perpendicular to a longitudinal axis of said optical waveguide.

6. An apparatus as recited in claim 2, further comprising:

(a) said first end of said optical waveguide is coupled to said means for launching said coherent beam of radiation therein;

(b) said second end of said optical waveguide is coupled to said means for receiving said coherent beam of radiation; and (c) said predetermined portion of said optical waveguide is midway between said first and second ends.

* * * * *